United States Patent
Kraft et al.

(10) Patent No.: US 6,691,104 B1
(45) Date of Patent: Feb. 10, 2004

(54) SYSTEM AND METHOD FOR PERSONALIZING AND APPLYING A POST PROCESSING TOOL SYSTEM

(75) Inventors: Reiner Kraft, Gilroy, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,211

(22) Filed: Jan. 12, 2000

(51) Int. Cl.$^7$ .............................................. G06F 17/30
(52) U.S. Cl. ...................... 707/3; 707/104.1; 709/217; 715/505.1
(58) Field of Search ................... 707/1–10, 104.1; 709/217; 715/501.5; 345/738, 809, 803

(56) References Cited

U.S. PATENT DOCUMENTS

| | | | | |
|---|---|---|---|---|
| 5,752,246 A | * | 5/1998 | Rogers et al. | 707/10 |
| 5,761,663 A | * | 6/1998 | Lagarde et al. | 707/3 |
| 5,855,020 A | * | 12/1998 | Kirsch | 707/10 |
| 5,953,732 A | * | 9/1999 | Meske, Jr. et al. | 707/10 |
| 6,012,098 A | * | 1/2000 | Bayeh et al. | 709/246 |
| 6,064,977 A | * | 5/2000 | Haverstock et al. | 705/9 |
| 6,128,655 A | * | 10/2000 | Fields et al. | 709/219 |
| 6,151,624 A | * | 11/2000 | Teare et al. | 707/5 |
| 6,154,501 A | * | 11/2000 | Friedman | 707/3 |
| 6,154,738 A | * | 11/2000 | Call | 707/4 |
| 6,167,449 A | * | 12/2000 | Arnold et al. | 707/10 |
| 6,182,097 B1 | * | 1/2001 | Hansen et al. | 707/526 |
| 6,202,062 B1 | * | 3/2001 | Cameron et al. | 707/3 |
| 6,219,700 B1 | * | 4/2001 | Chang et al. | 709/222 |
| 6,226,675 B1 | * | 5/2001 | Meltzer et al. | 709/223 |
| 6,263,332 B1 | * | 7/2001 | Nasr et al. | 707/5 |
| 6,269,370 B1 | * | 7/2001 | Kirsch | 707/10 |
| 6,279,006 B1 | * | 8/2001 | Shigemi et al. | 707/101 |
| 6,289,501 B1 | * | 9/2001 | Mutschler, III | 707/3 |
| 6,295,559 B1 | * | 9/2001 | Emens et al. | 709/225 |
| 6,311,214 B1 | * | 10/2001 | Rhoads | 709/217 |
| 6,317,783 B1 | * | 11/2001 | Freishtat et al. | 709/218 |
| 6,397,219 B2 | * | 5/2002 | Mills | 707/10 |
| 6,516,337 B1 | * | 2/2003 | Tripp et al. | 707/104.1 |
| 6,529,899 B1 | * | 3/2003 | Kraft et al. | 707/3 |

OTHER PUBLICATIONS http://www.ibm.com/developer/java.

* cited by examiner

*Primary Examiner*—Kim Vu
*Assistant Examiner*—Anh Ly
(74) *Attorney, Agent, or Firm*—Jon A. Gibbons; Fleit, Kain, Gibbons, Gutman, Bongini & Bianco P.L.

(57) ABSTRACT

A system and method for associating a personalized application tool and/or service in response to data supplied by any number of search requests is disclosed. The present invention in some preferred embodiments integrates a Session Manager (0601), Registration Manager (0602), Result Analyzer (0603) Tool/Service Integrator (0604), Request Server (0605) in conjunction with a User Registration Profile Database (0606) and a DTD Search Engine Schema (0607). Several preferred embodiments of the present invention are configured to process user search requests (0611) comprising Internet search queries (0612) that are subsequently processed by an Internet Search Engine (0613) under control of a Session Manger (0601). The focus of the present invention is to automate the post-processing of search results by automatically applying a user-specified data analysis tool to the search results, thus improving the overall efficiency of the searching and data analysis functions by a given user.

16 Claims, 7 Drawing Sheets

5) http://www.cs.cityu.edu.hk/~ml/cs3181/applets/ass3/30/HeapSort.java
Classes: HeapSort
Abstract: (No description available) [Details] [Map]

6) http://www.ee.umanitoba.ca/~blight/c24451/heapsort.java
Classes: heapsort
Abstract: (No description available) [Details] [Map]

7) http://www.ee.umanitoba.ca/~blight/c24451/heap_test.java
Classes: heap_test
Abstract: (No description available) [Details] [Map]

8) http://www.cs.cityu.edu.hk/~ml/cs3181/applets/ass3/2/HeapSort.java
Classes: HeapSort
Abstract: (No description available) [Details] [Map]

9) http://wesley.informatik.uni-freiburg.de/~unruh/Vorlesungen/Infoll/sortTest2.java
Classes: comparable array heapSort comparableInt sortTest
Abstract: * File: sortTest.java * Beschreibt das Verhalten vergleichbarer Objekte * Hilfts~ Klasse array.dient zun Vertauschen * von zwei Eintraegen in beliebigem Array von Objekt ... Abstract class comparable Erzuega einen He Carry on, in the name of the Lord! 1 = m; (weser schreibt so' nen Scheiss? Pascal- Fuzzist ) kay hier koennte no [Details] [Map]

FIG. 4
(PRIOR ART)

SYSTEM AND METHOD FOR PERSONALIZING AND APPLYING A POST PROCESSING TOOL SYSTEM

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

The present invention relates generally to field of Internet Search Engines, Web browsers, and resource gathering and has special application in situations where these functions are further integrated with post-processing functions applied to the results of searches performed using theses software tools.

2. Description of the Related Art

The invention is related in the general area of Internet Search engine technology. Conventional Internet search engines permit users to search for a wide variety of information on the WWW. There are also domain-specific search engines (such as that exemplified by jCentral, http://www.ibm.com/developer/java) that provide users a more focused search within the desired domain.

Typically a successful search produces a search result page with result items (each usually contain a URL), an abstract, and some additional information about the resource found. A user can use a pointing device (e.g., mouse) to select a result item and request a download of the document. This is typically a manual process, with no existing system providing a predefined method of associating a post-processing application with the search results provided by the Internet search engine.

Description of the Prior Art

The prior art with few exceptions has no system or method available to associate tools and/or applications with the results of Internet search results.

Web-Based Prior Art

The prior art includes web-based systems that provide a static assignment of web tools and/or services mapped to search results. As an example, jCentral (http://www.ibm.com/developer/java) offers a class visualizer for Java source code or for Java applets. The present invention, however, goes beyond this concept by letting the user integrate their own tools and/or services and thus personalize the post-processing options.

File Extension Based Prior Art

However, it should be noted that a variety of static and/or contextual application/data associations are known in the art. Specifically, the Microsoft® Windows™ operating environment permits association of a file "type" as determined by a filename extension to be associated with a given handling application. The structure of this application association is illustrated in FIG. 1, with the modal dialog boxes implementing this functionality illustrated in FIG. 2 and FIG. 3.

Referencing FIG. 1, an exemplary association of a Tagged Image File Format (TIFF) file is illustrated to show the techniques used by the prior art. In this configuration the tool and/or service association begins by using registration dialog(s) (0101) (detailed in FIG. 2 and FIG. 3) that associate an application such as the KODAK® image previewer KODAKPRV.exe with the "tif" file extension (0102). This association is typically stored in a Windows™ Registry (0103).

As an example of how this functionality is executed, the filename."ABC.tif" (a Tagged Image Format File having a "tif" extension) may be selected within an application such as the FILE MANAGER (0105) and associated with a specific application such as the KODAKPRV.EXE image previewer using the modal dialog box illustrated in FIG. 2. The application action and/or activation associated with triggering (generally in the form of double-licking a Microsoft® Windows™ file icon) the file is defined in a modal dialog box as typified in FIG. 3. Referencing FIG. 1, it can be seen that the KODAKPRV.exe application (0104) is activated by reference to the Windows™ Registry (0103), the tool/service executed (0106), and the designated file is OPENed for access by the associated application (0107) by using the filename "ABC.tif" as a parameter to the tool/service application.

As with other methods of associating filename extensions to application activations, the prior art requires that for each application file the filename extension be properly keyed to permit proper association of the control application for that file type. This is a significant problem in processing data generated by a wide variety of search engines, as this information is generally not tagged with appropriate filename extension information.

Search Engine Prior Art

Referencing FIG. 4, the prior art with respect to search engines has traditionally not provided a method to permit the user to dynamic associate post-processing tools with the search results obtained from a web browser. The scope of the post-processing activity has in general been limited to the use of hyperlinks (0401) or some form of file extension based application activation methodology.

Objects of the Invention

Accordingly, the objects of the present invention are (among others) to circumvent the deficiencies in the prior art and affect one or more of the following objectives:

(1) Provide a system and method to permit automatic activation of user-defined applications in response to the Internet search request results; (2) Permit users to allow a wide variety of service applications and tools to be associated with the results of Internet searches.

While these objectives should not be understood to limit the teachings of the present invention, in general these objectives are achieved by the disclosed invention that is discussed in the following sections.

SUMMARY OF THE INVENTION

The invention is related in the general area of Internet Search engine technology. The present invention goes on step further that the prior art and provides the user the possibility to permit the search result items to be automatically used as input for post processing based on a personalized user profile that determines the type of processing tool and/or service and how it is to be applied to the search result item.

Referencing FIG. 5, the present invention permits the user to register personal tools and/or services for use in post-processing search results (0501). The example search results page illustrated in FIG. 5 is based on the jCentral Java search engine, but the concept may be applied to any variety of search engines or the like. In illustrated example the tool could be a Java compiler residing on the user's personal computer (client side). The registration process contains information about the user, the name of the tool, the type of data the tool and/or service can handle as an input for processing, and how to access and use the tool (parameter).

Once registered, the user can take advantage of the present invention. The essentials of the invention are as follows. When the user performs a search query for Java source code, the search engine creates a result set. The present invention then determines the user and verifies whether there are registered tools and/or services for this user that can properly process the type of result item (e.g., Java source code). In this example the user registered a Java compiler. Using this context the present invention creates some HTML markup in the result page for the matching type (Java source code) that when activated by the user invokes the user's tool.

Example

To illustrate the teachings of the present invention, a concrete example based on the jCentral search engine (http://www.ibm.com/developer/java) will now be provided. jCentral lets users search for Java resources using Java specific search features. With the present invention, a user would typically first register a tool and/or service. In this example, the user wants to register a Java compiler. The present invention then provides a registration form. The user then would typically apply for a username and a password for data protection purposes. At this point the following information is provided for the application tool:

| | |
|---|---|
| Tool: | Java Compiler (Friendly name) |
| Filename: | javac.exe |
| Local Path: | C:\jdk1.2 |
| Arguments: | 1. [options] |
| | 2. URL |

The information is stored on the server side in a database and associated with the user's profile.

Once registered, the user is able to perform a search. In this example the user is searching for Java source code, which implements a heap sort algorithm. He/She fills out the jCentral search form and issue a query to the jCentral search engine. Note that the present invention could use a "Cookie" mechanism to store the tool information also on the client machine and retrieve the data as part of the search request. This is just another way of implementing the user profile.

The present invention receives the search request and queries the database for the user profile (or extract the cookie data from the search request). It then forwards the search request to the actual search engine. Before sending back the result page it inserts the HTML markup for the user defined tool and/or service. As a result the search results contain a choice selection GUI where the user can activate a personalized tool and/or service. FIG. 5 illustrates an exemplary jCentral result page that was generated from the present invention. Note that the "Java compiler" choice box was generated from the present invention based on the registered user profile of the user.

Exemplary Advantages

Overall the present invention can in some exemplary embodiments provide one or more of the following advantages over the prior art:

(1) By offering the user the possibility to link personalized tools and/or services with the search results of a search query, the user leverages convenience and a variety of other general benefits. Instead of downloading a requested document, saving it to a local hard drive, downloading and setting up a type specific software application, and then finally starting the application and provide the saved document as an input, the user registers a personalized application tool just once.

After the registration the present invention adds the corresponding HTML markup to each search result item in the result set. This markup is interpreted by the user's web browser when activated by the user and invokes the user's tool and/or service with the correct syntax and the specific search result item as an input for further processing. This post-processing is fully automatic on the client side by the user's tool and/or service.

(2) Instead of using tools and/or services provided from a service provider, such as an Internet search engine, the user is able to integrate personalized tools and/or services, and customize these as desired. The present invention is based on user profiles that provide a very flexible and customizable way to manipulate and process the search results.

The present invention has wide application in the application of web-based services, and since these applications will become more dominant in the future, the present invention may provide for additional benefits other than described above. One skilled in the art will realize that these advantages may be present in some embodiments and not in others, as well as noting that other advantages may exist in the present invention that are not specifically listed above.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 4 illustrates a prior art Internet search results page.

DETAILED DESCRIPTION OF AN EMBODIMENT

Figure 1:
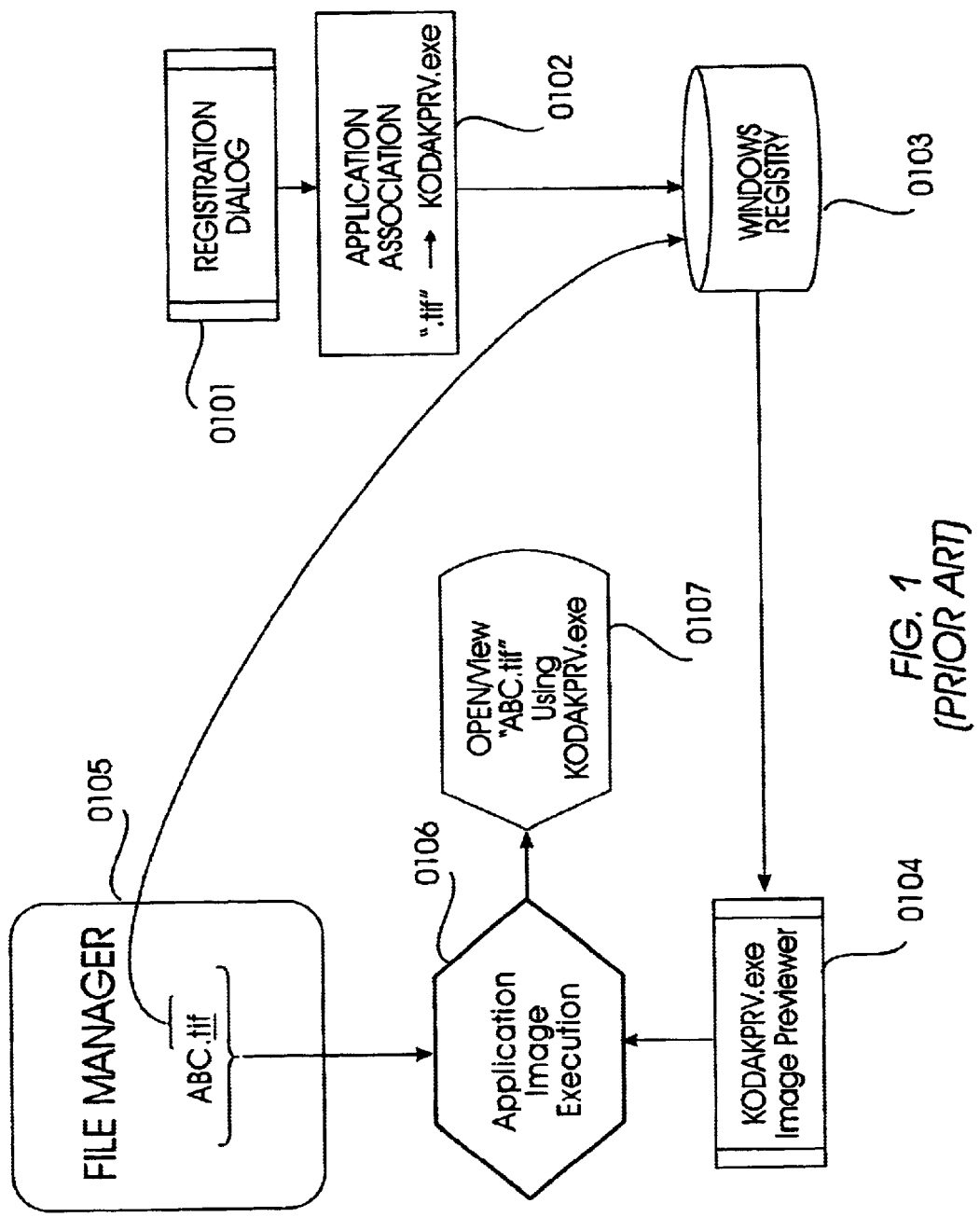
FIG. 1 illustrates a prior art system block diagram of how conventional application tool associations are performed within the Microsoft® Windows™ operating environment.
Figure 2:
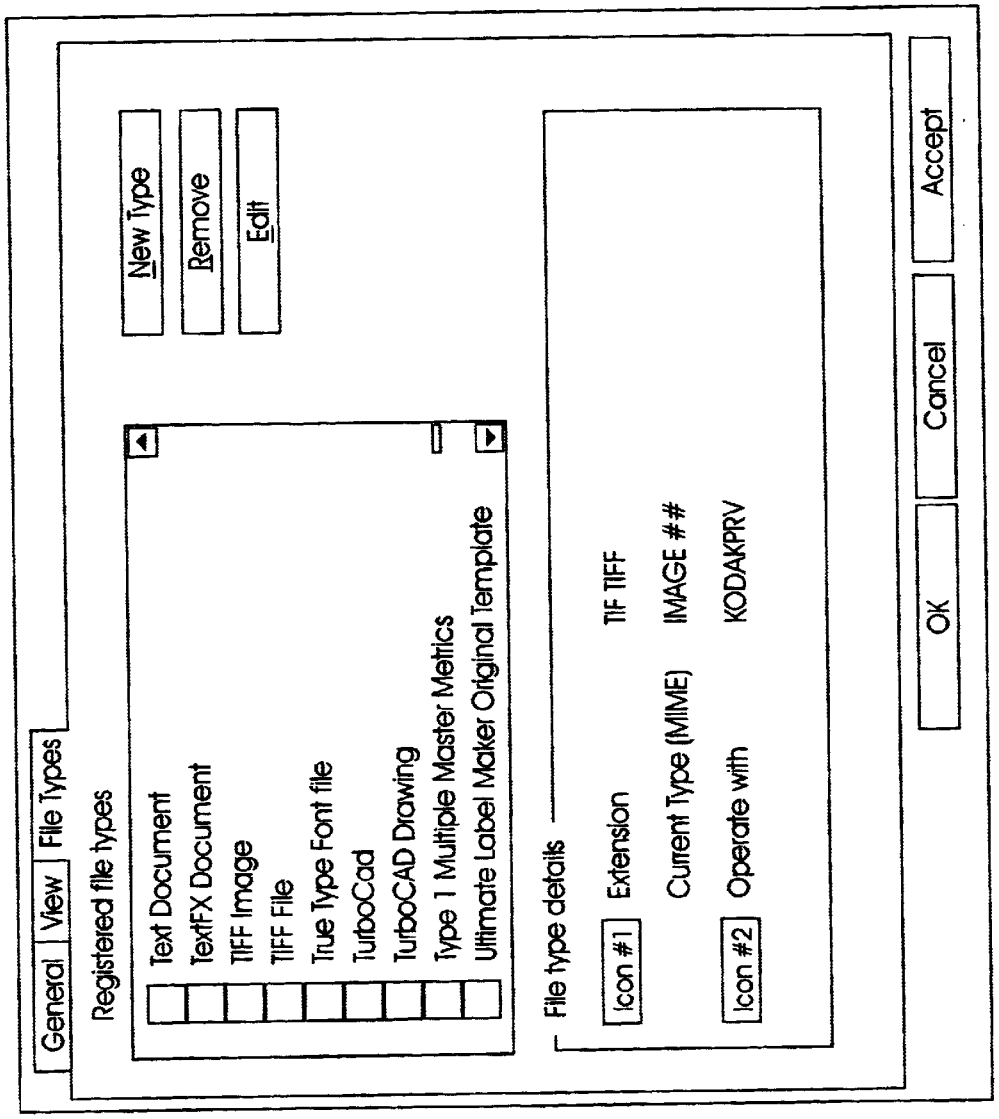
FIG. 2 illustrates a prior art modal dialog box used within the Microsoft® Windows™ operating environment to define a filename extension to application activation link.
Figure 3:
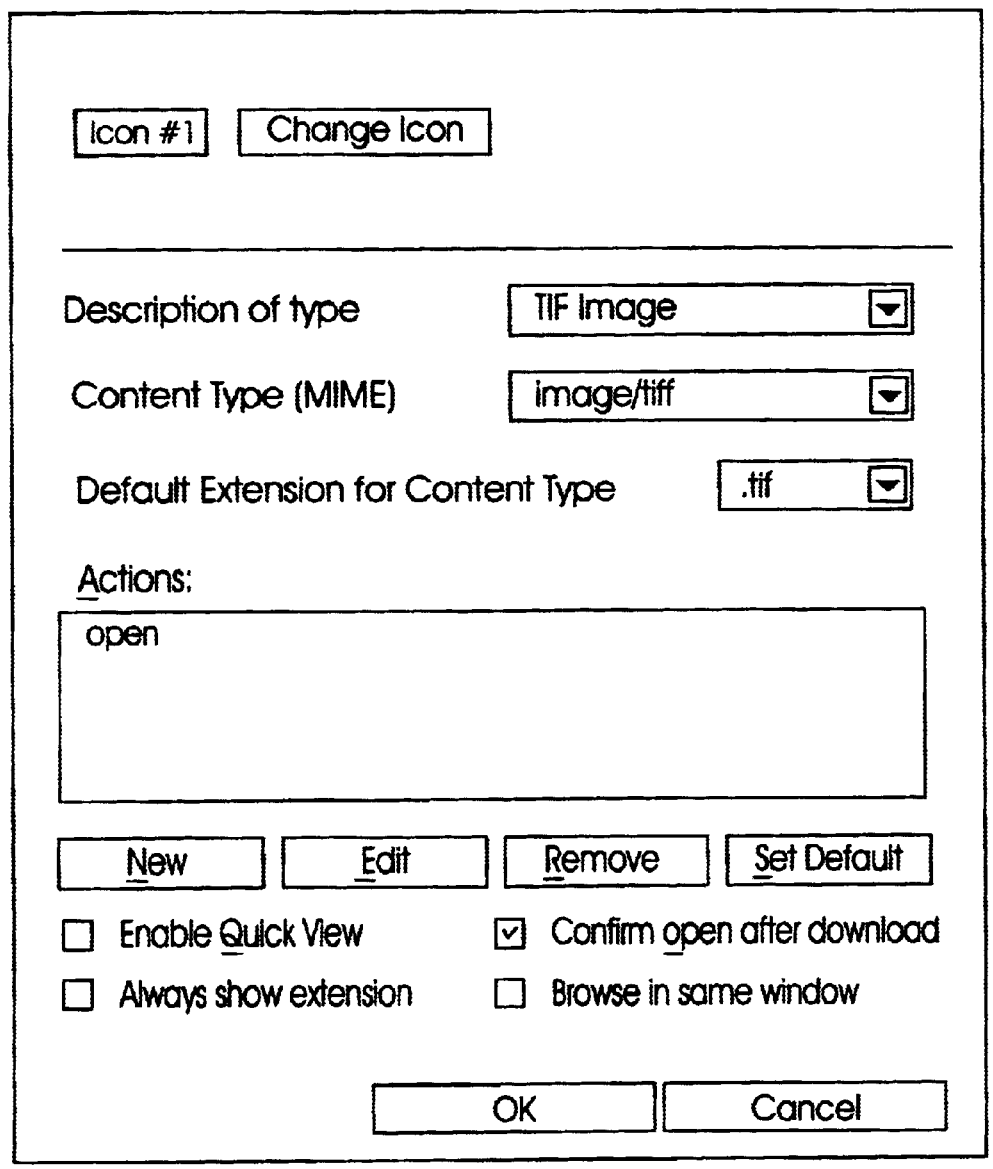
FIG. 3 illustrates a prior art modal dialog box used within the Microsoft® Windows™ operating environment to define an activation function associated with triggering a file by filename extension.
Figure 5:
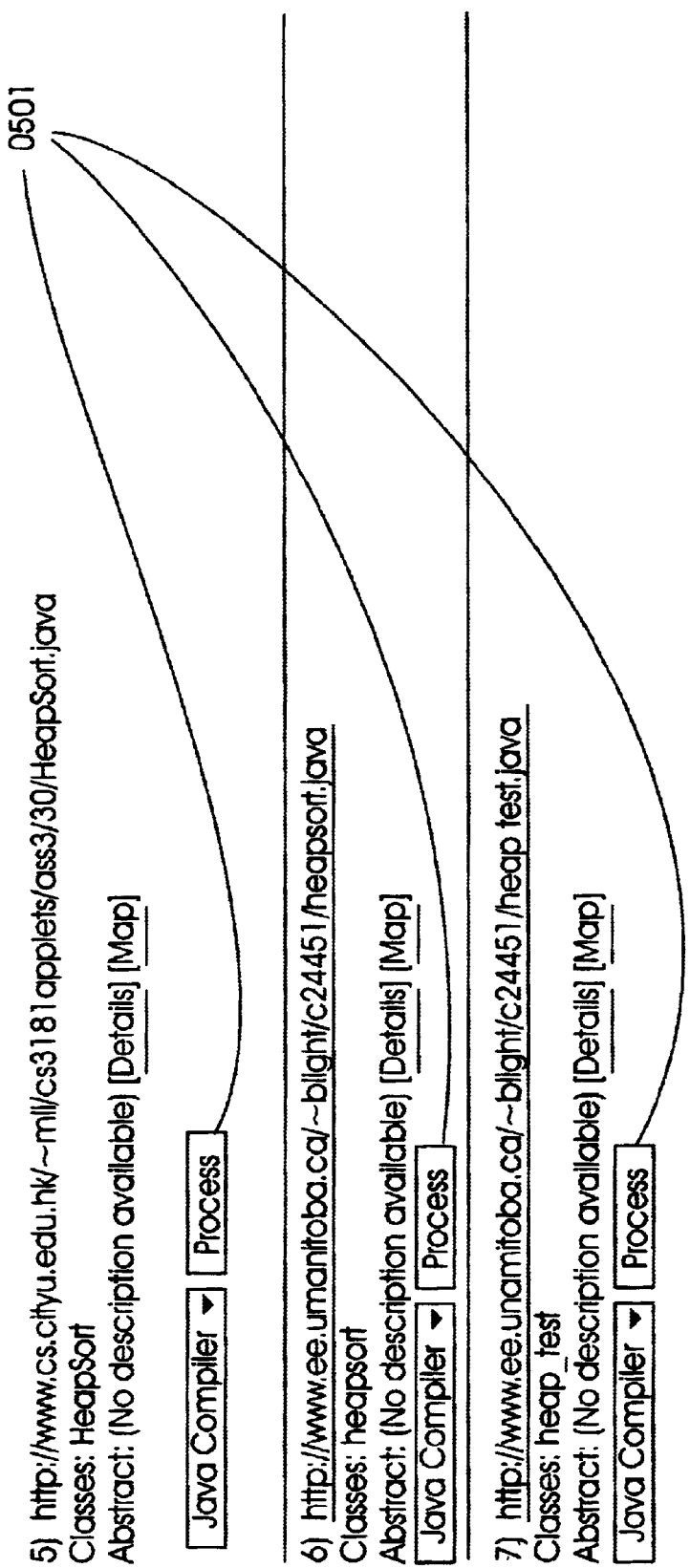
FIG. 5 illustrates an exemplary Internet search results page generated by the present invention.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized.

System Blocks/Procedural Steps Not Limitive—The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive—Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications. Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface.

Internet/Intranet Not Limitive—Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

Post-Processing Not Limitive—While the present invention has special application to situations in which search results data is to be post-processed by an application tool and/or service, nothing in the scope of the teachings of the present invention should be interpreted to limit the scope of application to this field. One skilled in the art will quickly recognize the applicability of the present invention to other data processing applications, including but limited to pre-processing of search results and filtering of search queries prior to or during the searching process.

Web Browser Not Limitive—Throughout the discussion herein the present invention will be discussed in terms of applications involving a web browser. However, the scope of the present invention should not be limited to this specific application.

Furthermore, while the present invention may incorporate means for activating the application tool and/or service, this function may be incorporated in some system components not a part of the invention as implemented. Furthermore, the application association need not result in a mandatory invocation of the target handling tool and/or service for the teachings of the present invention to apply.

Exemplary System Architecture (0600)

Figure 6:
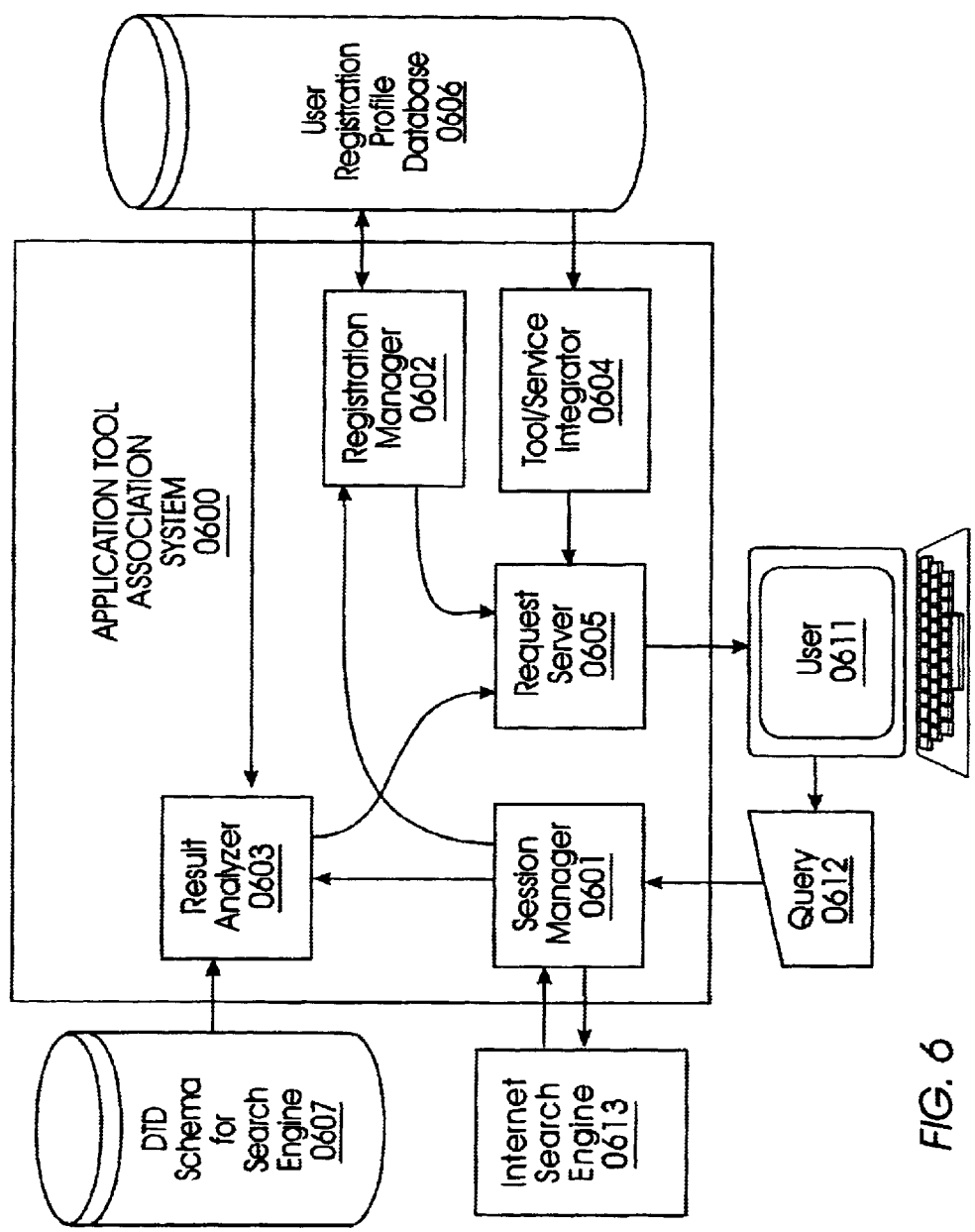
FIG. 6 illustrates a system block data flow diagram of an exemplary embodiment of the present invention.

Referring to FIG. 6, the exemplary system (0600) comprises of the following components:
(1) Session Manager (0601);
(2) Registration Manager (0602);
(3) Result Analyzer (0603);
(4) Tool/Service Integrator (0604);
(5) Request Server (0605);
(6) User Registration Profile Database (0606); and
DTD Schema for Search Engine (0607).

These system elements will now be discussed in detail.

Session Manager (0601)

First, the Session Manager (0601) receives a request from the user, typically in the form of a query (0612) generated from some user interface (0611). The Session Manager (0601) coordinates user and session management. The main task of the Session Manager (0601) is to analyze the user request and to determine whether the request represents a user query or a tool/service registration for a specific URL. In case the request is a search request, the Session Manager (0601) forwards the request to the Search Engine (0613). Otherwise, it will forward the tool/service registration process to the Registration Manager (0602). Any status and error messages will be forwarded to the Request Server (0605) for dispatch to the User (0611).

Registration Manager (0602)

The Registration Manager (0602) receives a registration request from the Session Manager (0601) and manages the users of the Search Engine (0613), stores and retrieves user profiles, etc. In case of a registration for a new tool and/or service based upon a registration request, the Registration Manager (0602) adds the provided information about a new tool/service (e.g., Tool URL, Name, Parameters, etc.) to the User Registration Profile Database (0606) and associates it with the user's profile. The Result Analyzer (0603).

The Result Analyzer (0603) receives search results from the Search Engine (0613) based upon a user's search request. Before it does any work it performs a lookup using the session/user ID of the user who issued and the search query to check whether there are any registered tools and/or services for this user. If not, the Result Analyzer (0603) simply forwards the search result page directly to the Request Server (0605). Otherwise Result Analyzer (0603) analyzes the search result page and extracts the URLs of the found external resources. It does this by applying the knowledge from the DTD Schema (0607) that provides information of how to extract key information and use the search result page. The DTD is the Document Type Definitions of the W3C XML 1.0 standard which provides a way to define the structure of an XML document through a document type definition. DTDs have widespread support in the industry and in the XML applications that are currently available. In simple terms, we use a DTD to define the structure of the XML file by using special characters that indicate pattern for these elements. For a more detailed description we refer to current literature about XML. The extracted URLs will be marked so that the Tool/Service Integrator (0604) can rapidly identify these items. As an example this markup might take the following form:

<BEGIN_URL>http://www.ibm.com/e-business/</BEGIN_URL>

When the URLs in the search results page are identified, the modified result page will be routed to the Tool/Service Integrator (0604) along with the Session/User ID.

Tool/Service Integrator (0604)

At this point the Tool/Service Integrator (0604) performs a lookup based on the session/user ID in the User Registration Profile Database (0606) to check what tools are registered, and which type of URL they are capable of processing. It then assigns all available tools matching a specific URL type to each result URL. This step is accomplished by inserting HTML markup tags that the user may later use to invoke the registered post-processing tool. Note that the Tool/Service Integrator (0604) erases the previous markup done by the Result Analyzer (0603). This markup is no longer required, and was just temporarily used by the Tool/Service Integrator (0604) to quickly identify the URLs in the search result page. When the Tool/Service Integrator (0604) has completed inserting the necessary markup in the result page it will forward the newly created result page to the Request Server (0605).

Request Server (0605)

The Request Server (0605) returns all the received data back to the user. It adds some header information (based on the HTTP protocol spec), integrates some style sheets for representation if necessary so that the user receives a proper search result that may be displayed in a standard search browser. Please note that with current browser technology, the Request Server (0605) also needs to send some binary code, such as a Java applet or ActiveX control, integrated in the result page back to the user. This component is needed on the client side (browser), to activate and run the user's registered program. Otherwise, the browser would have no access to the user's local machine and file system. For security reasons this binary code can be digitally signed by the provider/implementer of the present invention. These are implementation issues that while not discussed in detail here, are well within the scope of one skilled in the software arts to implement.

Tool/Service Hosting

It should be noted that the tools and/or services mentioned herein are not necessarily processed and/or hosted by the present invention. This is generally the responsibility of the user. The present invention typically provides only the registration mechanism of these tools and/or services and the corresponding user profile management, along with an optional means of activating the tool/service for a given search request. During a search query the present invention associates URLs of a user with personalized tools and/or services that have been registered by this user.

Exemplary Application Tool Association Method

Figure 7:
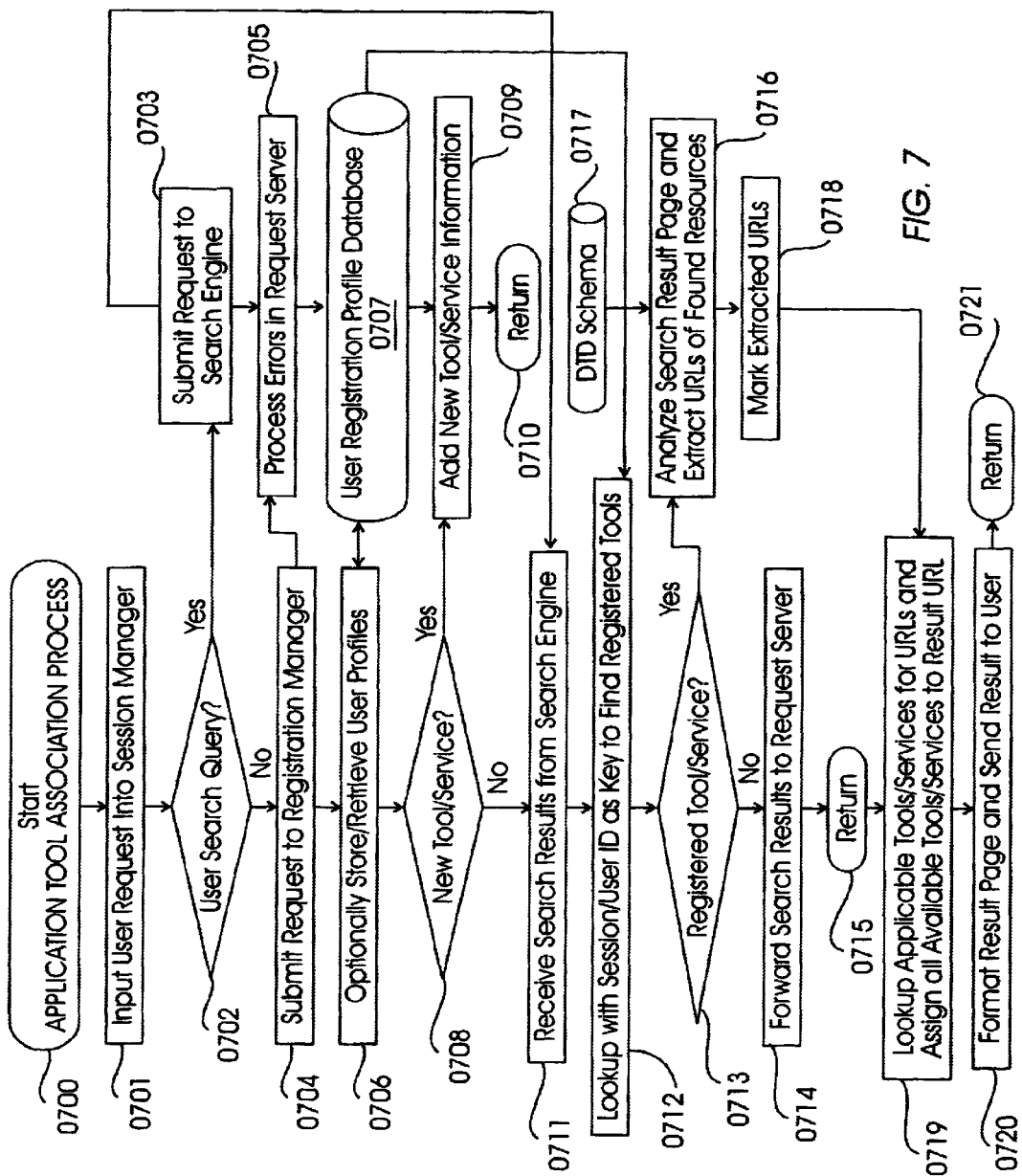
FIG. 7 illustrates a process flowchart of an exemplary embodiment of the present invention.

An exemplary general present invention method may best be understood by referencing the system diagrams of FIG. 6 and the exemplary flowchart of FIG. 7. These diagrams will now be discussed in detail.

Referencing FIG. 7, the exemplary Application Tool Association method (0700) involves the following steps:

(1) Obtaining an input request (typically from a user) (0701) and submitting the search request to a session manager.

(2) Determining if the user request is a search query (0702), and if so, submitting the request to a Search Engine (0703).

(3) Otherwise, submitting the user request to a Registration Manager (0704).

(4) Optionally processing errors from the Search Engine and Registration Manager with a Request Server (0705).

(5) Optionally storing and/or retrieving user profiles (0706) in a User Registration Profile Database (0707).

(6) Determining if a new tool and/or service is to be registered (0708), and if so, adding new tool/service information (0709) to the User Registration Profile Database (0707), then exiting the tool/service update (0710).

(7) Otherwise, receiving Search Results from the Search Engine (0711).

(8) Looking up (using the Session/User ID as an indexing key) registered tools (0712) in the User Registration Profile Database (0707).

(9) Determining if there are registered tools (0713) in the User Registration Profile Database (0707), and if not, forwarding Search Results to a Request Server for display (0714) and exiting the tool mapping process (0715).

(10) Otherwise, analyzing the Search Results page (0716) using a DTD Schema (0717) and Extracting URLs of the found resources.

(11) Marking the Extracted URLs (0718).

(12) Looking up applicable tools/services for URLs and assigning all available tools/services to the resulting URL (0719).

(13) Formatting the Result Page and sending the result to the user (0720) via a browser or other means that may optionally be used to activate the applications associated with the search results by the Registration Manager.

(14) Exiting the tool mapping process (0721).

One skilled in the art will recognize that these steps may be rearranged and/or augmented with no loss of generality in the teachings of the present invention.

Computer Software

As would be known by one skilled in the art and as indicated in FIGS. 6–7, the system and method described herein and generally illustrated in FIGS. 6–7 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft® Windows™ operating environment in all its variations or its equivalent commercial embodiments, including but not limited to any system incorporating a graphical user interface.

Conclusion

A Application Tool Association system and method have been disclosed wherein information retrieved from a variety of search engine results may be automatically processed using tools selected by a user and maintained via references within a user registration profile database. As compared to the prior art, the present invention automates what was once a manual task, that of selecting and activating data analysis tools that operate on data sets obtained from conventional search engines.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. An application tool association method comprising:
   obtaining a user input request, wherein the user input request is one of a registration and a search query, wherein the registration specifies an association between a data type and a tool and/or service that is used to render that data type;
   determining if a new association between a data type and a new tool and/or service is to be registered in response to the registration, and if so, adding new tool/service information to a User Registration Profile Database;
   looking up registered tools in the User Registration Profile Database, using the Session/User ID as an indexing key;
   determining if there are registered tools in said User Registration Profile Database, and if so, analyzing a Search Results page and extracting URLs of the found external resources, wherein the Search Results page comprises search results containing URLs of external resources that are responsive to the search query;
   marking said Extracted URLs;
   inserting at least one tool link into the search results page, wherein the tool link specifies a tool and/or service that is associated with a data type associated with each of the extracted URLs, wherein the data type associated is specified by a specification in a registration that was provided by a previous user input request and that was added to the User Registration Profile Database; and
   formatting and sending the Results Page to said user via a browser or other means.

2. An application tool association method as performed on a search engine computer, the method comprising:
   accepting a search query;
   determining a set of results dependent upon the search query, wherein the results comprise at least one description of an external resource;
   identifying a tool/service based upon a registration and at least one result within the set of results, wherein the registration comprises an association of a data type of the external resource and at least one tool/service, wherein the tool/service is a processor that is able to render the external resources of the data type;
   inserting at least one tool link into the set of results, wherein the tool link enables the user to activate operation of the tool/service upon the external resource; wherein the tool link specifies a tool and/or service that is associated with a data type associated with the set of results, wherein the data type associated is specified by a specification in a registration that was provided by a previous user input request and that was added to a user profile; and
   returning to the user the set of results with the inserted at least one tool link.

3. The method as set forth in claim 2, wherein the step of identifying utilizes a DTD schema.

4. The method as set forth in claim 2, wherein the step of returning returns a result page formatted according to HyperText markup Language and wherein the at least one tool link is an HTML markup tag.

5. The method as set forth in claim 2, further comprising: storing a plurality of registrations for one or more users.

6. The method as set forth in claim 5, wherein the step of identifying a tool/service comprises the step of retrieving the plurality of registrations for the user.

7. An application tool association system, comprising:
   a request server for accepting a search query;
   a registration manager that stores an association between a data type and a tool/service, wherein the tool/service is a processor that is able to render the external resources of the data type;
   a search engine that determines a set of results dependent upon the search query;
   a results analyzer that identifies the tool/service based upon the association and a data type of at least one result within the set of results; and
   a request server that:
     inserts at least one tool link into the set of results, wherein the tool link enables a user to activate operation of the tool/service upon the at least one result; wherein the tool link specifies a tool and/or service that is associated with a data type associated with the set of results, wherein the data type associated is specified by a specification in a registration that was provided by a previous user input request and that was added to a user profile; and
     returns to the user the set of results and an indication of the tool/service.

8. The system as set forth in claim 7, wherein the results analyzer utilizes a DTD schema.

9. The system as set forth in claim 7, wherein the request server returns a result page formatted according to HyperText markup Language and wherein the indication of the tool/service is an HTML markup tag.

10. The system as set forth in claim 7, wherein the registration manager stories a plurality of registrations for one or more users.

11. The system as set forth in claim 10, wherein the results analyzer retrieves the plurality of registrations for the user.

12. A computer usable medium having computer-readable program code means providing application tool association, said computer-readable program means comprising computer program code means for:

accepting a search query;

determining a set of results dependent upon the search query;

identifying a tool/service based upon a registration and at least one result within the set of results, wherein the tool/service is a processor that is able to render an external resources of the data type;

inserting at least one tool link into the search result data set, wherein the tool link specifies the tool/service; that is associated with a data type associated with the search result data set, wherein the data type associated is specified by a specification in a registration that was provided by a previous user input request and that was added to a user profile; and returning to the user the set of results with the inserted at least one tool link.

13. The computer usable medium of claim 12, wherein the computer program code means for identifying utilizes a DTD schema.

14. The method as set forth in claim 12, wherein computer program code means for returning returns a result page formatted according to HyperText markup Language and wherein the tool link is an HTML markup tag.

15. The method as set forth in claim 12, further comprising computer program code means for:

storing a plurality of registrations for one or more users.

16. The method as set forth in claim 15, wherein the computer program code means for identifying a tool/service comprises computer program code means for retrieving the plurality of registrations for the user.

* * * * *